United States Patent [19]

Wachter

[11] Patent Number: 4,483,192
[45] Date of Patent: Nov. 20, 1984

[54] WATER LEVEL INDICATOR FOR NUCLEAR REACTOR VESSEL

[76] Inventor: William J. Wachter, R.D. 4 - English Rd., Wexford, Pa. 15090

[21] Appl. No.: 361,513

[22] Filed: Mar. 24, 1982

[51] Int. Cl.³ ............................................. G01F 23/10
[52] U.S. Cl. ..................................... 73/311; 340/624; 340/625; 73/319; 73/313; 73/309; 376/245
[58] Field of Search ................. 73/313, 319, 317, 311, 73/309; 340/624, 625, 623; 376/245, 249

[56] References Cited

U.S. PATENT DOCUMENTS

| | | | |
|---|---|---|---|
| 2,460,503 | 2/1949 | Howe | 73/309 X |
| 2,516,452 | 7/1950 | De Giers et al. | 73/311 |
| 3,119,268 | 1/1964 | Stanley | 73/311 X |
| 3,443,437 | 5/1969 | Skalka | 73/313 X |
| 3,545,272 | 12/1970 | McGill | 73/311 |
| 3,572,110 | 3/1971 | James et al. | 73/862.48 |

FOREIGN PATENT DOCUMENTS

| | | | |
|---|---|---|---|
| 819922 | 11/1951 | Fed. Rep. of Germany | 73/311 |
| 601334 | 2/1926 | France | 73/311 |

Primary Examiner—S. Clement Swisher
Assistant Examiner—Tom Noland
Attorney, Agent, or Firm—Thomas H. Murray; Clifford A. Poff

[57] ABSTRACT

A water level indicator for a pressure vessel is provided which employs a plurality of vertically spaced cantilevered mounted spring members. The free end of each spring member is connected to a depending float member. The float member has sufficient mass and density to depress its spring member when the float member is in a gaseous medium. The float member has sufficient buoyancy to elevate its spring member when the float member is in a water medium. One or more strain gauges is secured to each spring member to indicate the instantaneous position of the spring member and thereby provide an indication of the instantaneous water level.

12 Claims, 4 Drawing Figures

WATER LEVEL INDICATOR FOR NUCLEAR REACTOR VESSEL

BACKGROUND OF THE INVENTION

1. Field of the Invention

This invention relates to a device for indicating the instantaneous water level in a closed vessel which contains water and steam or other gases.

2. Description of the Prior Art

The nuclear energy generation industry employs pressurized water reactors and boiling water reactors. Pressurized water reactors are intended to be substantially filled at all times with pressurized water at elevated temperatures. In the event of leakage or other failures in the system, it is possible for the pressurized water reactor to develop a steam bubble or a bubble of steam and other gases in the top portion of the reactor vessel. At the present time the reactor vessels are not equipped with apparatus or devices to provide instantaneous information to the system operator to indicate that a bubble has developed or to follow the growth of the bubble downwardly. In the boiling water reactors, there is a steam bubble at the top of the vessel above ebullient pressurized water. It is desirable for the operator to know the location of the upper level of the pressurized water. The violent agitation of the pressurized water prevents any precise definition of a water level at any one instant. However knowledge of the range of the oscillating water level is of value to the system operator.

Various suggestions have been made for using pressure differential devices to provide indications of the instantaneous water level in these pressure vessels. At the present time, there are no known water level indicator devices in any of the nuclear reactor reactors. The proposed devices appear to have many shortcomings, not the least of which is their initial expense.

There is a serious need for a water level indicator in nuclear energy generator vessels. There is a particular need for a reliable device with fail-safe features. There is a need for a device which will not interfere with the nuclear energy generation functions.

DESCRIPTION OF THE INVENTION

The water level indicator of this invention comprises a plurality of float members, each suspended from a cantilevered spring. The cantilevered springs are vertically spaced apart. The mass and density of the float member is such that when the float member is in a gaseous medium, its weight will cause the cantilevered spring member to depress. When the float member is supported by water, its buoyancy will cause the spring member to elevate. Secured to the cantilevered spring member is one or more strain gauge devices adapted to exhibit a different electrical property (e.g., resistance) when compressed and when tensioned. The strain gauge device is secured to the cantilevered spring member such that when the spring member is depressed, the strain gauge will experience one type of stress (tension) if secured to the top or an alternate stress (compression) if secured to the bottom of the spring member. A strain gauge will experience the opposite stress when the cantilevered spring member is elevated: compression if the strain gauge is secured to the top of the spring member and tension if the strain gauge is secured to the bottom of the spring member. The change in electrical property of the strain gauge can be detected through an appropriate indicating device outside the pressure vessel to provide an indication of whether the related spring member is depressed or elevated. The indicator may be a simple Wheatstone bridge generating an electrical signal to light one lamp or another depending upon the direction of stress in the strain gauge.

A preferred embodiment employs two strain gauges on each of the cantilevered spring members, one on the top and one on the bottom to provide a redundancy of inspection.

In the preferred embodiment the plurality of cantilevered members and float members are secured within a tube which is supported within the reactor vessel, preferably through a connection to an instrument hole already provided in the dome surface of the vessel.

DESCRIPTION OF THE PREFERRED EMBODIMENTS

Figure 1:
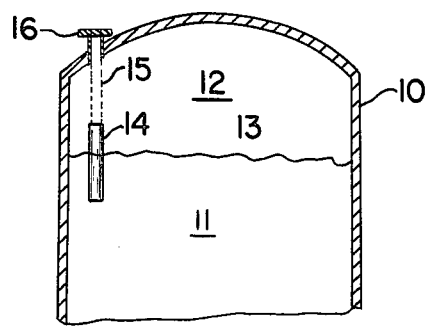
FIG. 1 is a fragmentary cross-section illustration of the top portion of a nuclear reactor vessel showing a preferred embodiment of the present invention.

Referring to FIG. 1, a vessel 10 has an inventory of water 11 and an inventory of steam 12. The upper level of the water is identified by the numeral 13. In a typical nuclear reactor vessel of the boiling water variety, the level 13 will be in violent agitation during the operation of the system. In a pressurized water reactor system, the vessel 10 will be substantially filled with water 11 at all times. A gas bubble 12 may appear and the corresponding water level 13 may develop only during periods of abnormal operation of the pressurized water reactor.

Positioned within the reactor vessel 10 is a water level indicator device 14 which is connected in some fashion, for example, the broken lines 15, to an instrument opening 16 in the dome surface of the vessel 10.

Figure 2:
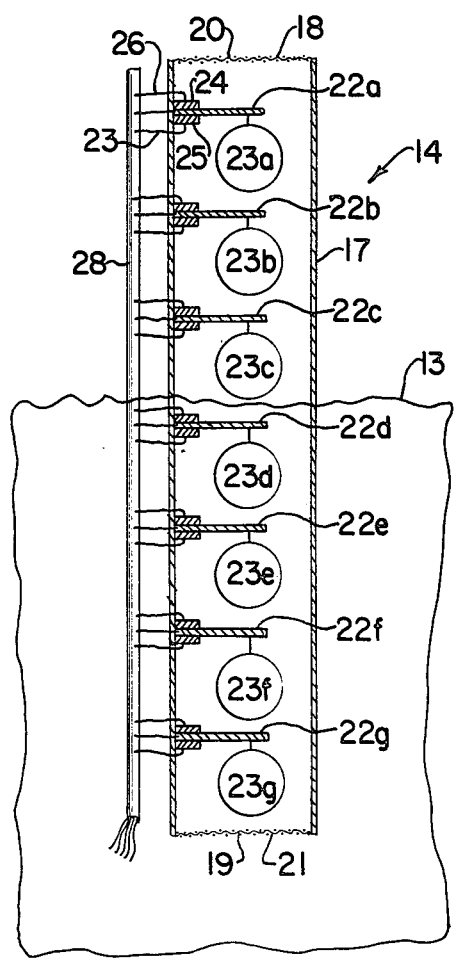
FIG. 2 is a cross-section illustration through the sensing device of this invention.

The indicator device 14, more clearly seen in FIG. 2, includes a vertically positioned tube 17 having a top end 18 and a bottom end 19. The top end 18 is enclosed with a foraminous member 20; the bottom end 19 is enclosed with a foraminous member 21. The tube 17 may have any desired geometrical shapes such as circular, square, hexagonal, etc. The tube 17 has a cross-sectional area of 7 to 250 square inches and a height of 12 to 30 inches. Mounted to the inner wall of the tube 17 are a plurality of cantilevered metal spring members 22, each having at its free end a float member 23 secured thereto and depending therefrom. The float members 23 has a density such that when positioned in a gaseous medium such as the floats 23a, 23b, 23c, their weight will cause the related spring member 22a, 22b, 22c to depress. The density of the floats 23 further is such that when positioned in water their buoyancy causes the spring members to elevate. For example, the floats 23d, 23e, 23f, 23g cause the spring members 22d, 22e, 22f, 22g to elevate.

The tube 17 is positioned within a water-steam vessel such that the top end 18 is above a water level 13 and the bottom level 19 is below the water level 13. Accordingly, some of the spring members 22 will be depressed and others will be elevated at all times.

As shown in FIG. 2, each of the spring members 22 has a strain gauge 24 secured to its upper surface and a strain gauge 25 secured to its bottom surface. Electrical conduits 26, 27 connect the strain gauges 24 and 25, respectively, to a multiconductor cable 28.

Figure 3:
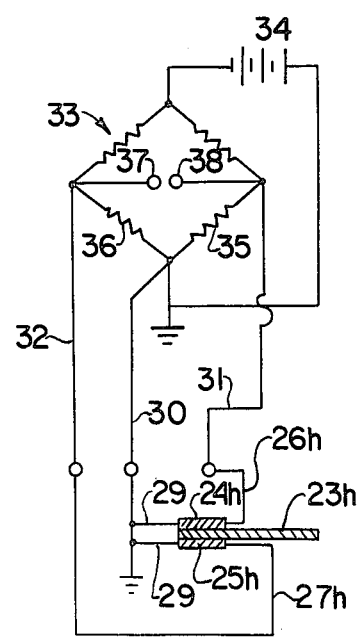
FIG. 3 is a schematic illustration of a typical sensing circuit for generating an indicator signal.

The multiconnector cable 28 extends out from the vessel 10 to appropriate sensing apparatus. Typical sensing apparatus is illustrated in FIG. 3 wherein a spring member 23h is illustrated with an upper strain gauge 24h and a lower strain gauge 25h. A ground conductor 29 is connected to a ground conductor 30. Conductors 26h, 27h are connected respectively to conductors 31, 32 which lead to opposite ends of a Wheatstone bridge 33. The other ends of the Wheatstone bridge are connected to a voltage source 34. The electrical resistance of the strain gauges 24h, 25h form a part of the resistance of the Wheatstone bridge resistors 34, 35, respectively. So long as the spring member 23h is unstressed and each of the strain gauges 24h, 25h is unstressed, the Wheatstone bridge 33 remains in a zero condition and develops a base electrical signal (preferably a null signal) across the Wheatstone bridge terminals 37, 38. As the spring member 23h is elevated, the electrical signal across the terminals 37, 38 changes in one direction; as the spring member 23h is moved in the opposite direction, the electrical potential between the terminals 37, 38 also moves in the opposite direction. The electrical potential from the terminals 37, 38 is applied to an appropriate indicator related to the individual spring member 23h.

Figure 4:
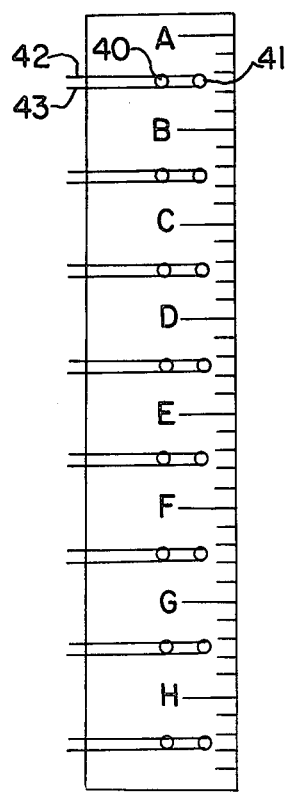
FIG. 4 is a view of a visual indicator board for the present indicator device.

Thus for each of the spring members 22 illustrated in FIG. 2, there is provided an independent circuit of the type shown in FIG. 3 for driving one or more lamps of an indicator panel of the type shown in FIG. 4. As shown in FIG. 4, a panel consists of one or more lamps 40, 41 corresponding to each level of the indicator device. The lamps 40, 41 are driven by electrical energy from conductors 42, 43 which receive the signal from the terminals 37, 38, respectively.

In a preferred embodiment, one of the lamps 40 is illuminated when the electrical current in the conductors 42, 43 moves in one direction and the other lamp 41 is illuminated when the electrical current in the conductors 42, 43 moves in the opposite direction. For each of the spring members 22 (FIG. 2) there is a corresponding lamp or lamps 40, 41 so that the system operator can visually determine from inspection of the panel board of FIG. 4 the instantaneous location of the water level 13. By providing two lamps 40, 41 which are energized alternatively in accordance with the positions of the related spring member, a fail-safe feature is provided whereby at all times only one lamp of each pair of lamps is energized.

For purposes of illustration, a Wheatstone bridge circuit is shown in FIG. 3. Alternative detecting devices and circuits can be employed to provide the desired indication of the instantaneous level of water in the vessel 10. The indication may be visual as suggested in FIG. 4 or may be audible or may be connected to servo operating circuitry.

While two strain gauges 24, 25 are preferred, the system also will operate effectively with a single strain gauge either above or below the spring member. Similarly the two strain gauges 24, 25 might be separately connected to a redundant sensing and indicating system to provide fail-safe operation of the system. In either of these systems, the strain gauge resistance will constitute all or part of the resistance of only one leg of the bridge circuit.

The foraminous covering member 20, 21 is intended to confine within the tube 17 any of the elements which might become separated or broken during the operation of the device. The apertures in the foraminous elements 20, 21 are at least 0.18 inch diameter to preclude undesirable corrosion accumulations. The apertures preferably are not greater than about 0.5 inch.

It is contemplated that the present indicator device 14 may be removed and replaced every time the pressure vessel 10 is taken out of service for routine maintenance.

In a pressurized water vessel which does not normally have any steam bubble, the device 14 will be positioned near the top of the vessel to detect the formation of a steam bubble and to follow its growth.

A further benefit of the present invention is the ability of the indicator to locate an intermediate zone between an upper steam region and a lower water region in an enclosed vessel. Ebullition at the upper portion of the water region creates an irregular water level. Similarly, the presence of water particles in the steam dominant zone immediately above the water level creates a steam-water medium. This intermediate zone of steam-water and water-steam may vary in total depth in accordance with a variety of parameters. A cantilevered spring member having its float member in the intermediate zone will be in oscillation as a result of the agitation of the steam and the ebullition of the water. For those spring members in the steam-dominant upper portion of the intermediate zone, the indicator means will present a spring depression indication upon which is superimposed an oscillation indication. For those spring members having their float members in the water dominant portion of the intermediate zone, the buoyancy of the float members will cause a normal elevation indication to which an oscillating indication is superimposed. Thus the present indicator provides a technique whereby the vessel operator can determine the presence of the described intermediate zone and its depth and location.

I claim:

1. An indicator for level of water in a pressure vessel, said indicator being mounted within the said pressure vessel and comprising a plurality of vertically spaced, horizontal spring members, each secured at one end and connected to a float element at the other unsecured end, said float element having sufficient mass and density to depress the free end of a said spring member when the said float element is in a gaseous medium and having sufficient buoyancy to elevate the said said other unsecured end of a said spring member when the float is in water;

indicating means associated with each of the said spring members for indicating externally of said pressure vessel whether the said other unsecured end of the spring member is in a depressed or elevated position.

2. The indicator of claim 1 wherein the said plurality of spring members is mounted in a tube having a vertical longitudinal axis; the said spring members each being secured to the inner wall of the said tube; a foraminous member enclosing the top of said tube and a foraminous member enclosing the bottom of the said tube;

said tube being secured within the said vessel at a level such that the top of said tube is positioned adjacent to the dome of the vessel and the bottom of the said tube is positioned in the water inventory of the said vessel.

3. The indicator of claim 2 wherein the said foraminous plates have apertures from 0.18 inch to 0.5 inch diameter.

4. The indicator of claim 2 wherein the said tube, said floats and said spring members are fabricated from stainless steel.

5. The indicator of claim 2 wherein the said tube has a cross-sectional area from 7 to 250 square inches and a height from 12 to 30 inches.

6. The indicator of claim 2 wherein each said spring member has at least one strain gauge secured thereto; an electrical conductor extending from each said strain gauge to a sensing device which provides an indication of the instantaneous stress applied to the said at least one strain gauge, said indication being an indication of whether the spring member is elevated or depressed.

7. The indicator of claim 6 wherein the said sensing device comprises a Wheatstone bridge and the electrical resistance of said at least one strain gauge comprises at least a part of at least one resistance of the said bridge.

8. The indicator of claim 1 wherein each of the said spring members has a first strain gauge secured to the top surface and a second strain gauge secured to the bottom surface thereof;

and wherein said indicating means comprises
an electrical conductor extending from each of the said strain gauges to a sensing device which provides an indication of the relative instantaneous stress applied to the said strain gauges, said indication being an indication of whether the spring member is depressed or elevated.

9. The indicator of claim 8 wherein the said sensing device comprises a Wheatstone bridge and the electrical resistance of the said two strain gauges comprising at least a part of two of the resistances of the said Wheatstone bridge.

10. The indicator of claim 1 wherein the said indicating means includes at least one lamp responsive to each of the said spring members.

11. The indicator of claim 10 wherein the said indicating means includes two lamps responsive to each of the said spring members, said two lamps being energized alternatively.

12. An indicator for identifying the location of an intermediate zone between an upper steam region and a lower water region in a pressure vessel, said indicator being mounted within the said pressure vessel and including at least two cantilevered spring members each having a float member at the free end thereof, each said spring member having means for indicating its instantaneous stress whereby those of the said spring members having float members in the steam-dominant portion of the said intermediate zone will provide an indication of spring depression and an oscillating indication related to steam agitation; and the said spring members in the water dominant portion of the said intermediate zone will indicate an elevation stress and an oscillating indication resulting from ebullition in the uppermost portion of the said water region.

* * * * *